(12) United States Patent
Ellsworth et al.

(10) Patent No.: US 6,397,995 B1
(45) Date of Patent: Jun. 4, 2002

(54) METHOD FOR CONTROLLING A CLUTCH FOR AN ENGINE-POWERED SYSTEM IN AN AUTOMOTIVE VEHICLE

(76) Inventors: Eric D. Ellsworth, 7842 Cherry Hill Rd., Ypsilanti, MI (US) 48198; Richard John Meckstroth, 41557 Fallbrook, Northville, MI (US) 48167

( * ) Notice: Subject to any disclaimer, the term of this patent is extended or adjusted under 35 U.S.C. 154(b) by 0 days.

(21) Appl. No.: 09/544,420

(22) Filed: Apr. 6, 2000

(51) Int. Cl.$^7$ .............................. B60H 1/32; F16D 27/14
(52) U.S. Cl. ...................... 192/54.1; 62/133; 192/82 R; 192/84.1; 192/103 C
(58) Field of Search ............................. 192/84.1, 82.1, 192/103 C, 54.4, 52.1, 54.1, 30 V; 62/133

(56) References Cited

U.S. PATENT DOCUMENTS

| 4,206,613 A | | 6/1980 | Shockley ...................... 62/133 |
| 4,305,258 A | | 12/1981 | Spencer, Jr. .................. 62/133 |
| 4,567,975 A | * | 2/1986 | Roll ....................... 192/30 V X |
| 4,650,052 A | * | 3/1987 | Okada ........................ 192/84.1 |
| RE33,140 E | * | 1/1990 | Booth ........................ 361/154 |
| 4,987,985 A | | 1/1991 | Meckstroth et al. ....... 192/58.3 |
| 5,094,332 A | * | 3/1992 | Wall ....................... 192/84.1 X |
| 5,228,305 A | | 7/1993 | Vogt ............................. 62/133 |
| 5,469,947 A | * | 11/1995 | Anzai et al. ............... 62/133 X |
| 5,628,390 A | * | 5/1997 | Richardson et al. ........ 192/84.1 |
| 6,003,493 A | * | 12/1999 | DeGeorge et al. ..... 123/406.23 |
| 6,145,329 A | * | 11/2000 | Brandon et al. ............... 62/133 |

FOREIGN PATENT DOCUMENTS

| JP | 63-90421 | * | 4/1988 | ................... 62/133 |
| JP | 1-119412 | | 5/1989 | |

* cited by examiner

Primary Examiner—Rodney H. Bonck

(57) ABSTRACT

A method for controlling a clutch 24 for an engine-powered system 26 in an automotive vehicle 10 is provided. In one embodiment, the engine-powered system 26 is an air conditioner system. The method includes the step 58 of generating an engine roll signal responsive to an oscillating roll movement of an engine 22 of the vehicle 10 about a torque roll axis 32. The engine roll signal is indicative of an oscillating engine roll acceleration about the torque roll axis 32. The method further includes the step 66 of determining a direction of the oscillating roll movement utilizing the engine roll signal. Finally, the method includes the step 74 of actuating the clutch 24 responsive to an operational parameter of the engine-powered system 26 and the direction of the oscillating roll movement.

21 Claims, 3 Drawing Sheets

METHOD FOR CONTROLLING A CLUTCH FOR AN ENGINE-POWERED SYSTEM IN AN AUTOMOTIVE VEHICLE

FIELD OF THE INVENTION

This invention relates to a method for controlling a clutch. In particular, the invention relates to a method for controlling a clutch for an engine-powered system, such as an air conditioner system, to minimize a vehicle vibration due to a torque pulse generated by actuation of the clutch.

BACKGROUND OF THE INVENTION

Air conditioner systems have long been utilized in automotive vehicles to enhance the comfort of vehicle occupants. Referring to FIG. 1, an automotive vehicle 10 is illustrated. Referring to FIG. 2, the vehicle 10 may include a conventional air conditioner system 11 that circulates a cooling medium. The air conditioner system 11 includes a compressor 12, a condenser 14, an expansion valve 16, an evaporator 18, and a pressure sensor 20. Referring to FIG. 1, the compressor 12 is mounted on an automotive engine 22 and is powered by the engine 22 via a driven belt 40, a pulley 36 and a clutch 24. The clutch 24 has a first state torsionally engaged with the compressor 12 and a second state disengaged from the compressor 12. When the clutch 24 is torsionally engaged with the compressor 12, the compressor 12 is driven by the belt 40. The compressor 12 compresses the cooling medium and delivers the cooling medium to the condenser 14, which transfers heat from the cooling medium. The condenser 14 delivers the cooling medium to the expansion valve 16 that expands the cooling medium into a gaseous form. The expansion valve 16 delivers the cooling medium to the evaporator 18 which transfers heat from air in a vehicle passenger compartment (not shown) to the cooling medium—to thereby cool the interior of the passenger compartment.

Referring to FIG. 3A, the engine 22 for powering the air conditioner system 11 is illustrated. The engine 22 is resting on engine mounts 28, 30 of the vehicle 10 and has a longitudinally extending torque roll axis 32. Referring to FIGS. 2 and 3A, the engine 22 includes a crankshaft 34, pulleys 36, 38, a belt 40, the clutch 24, and the compressor 12. The remaining components of the engine 22 have been removed for clarity of illustration. Referring to FIGS. 3A and 3B, during operation of the engine 22, the engine 22 rocks back and forth about the torque roll axis 32 at a natural frequency. The rocking motion of the engine 22 is generally called an oscillating roll movement. The natural frequency of the oscillating roll movement will vary with different engines and powertrains, but remains relatively constant at different engine speeds for a given engine and powertrain. FIGS. 3A and 3B illustrate the two extremes of the oscillating roll movement of the engine 22.

Referring to FIG. 3A, during operation of the engine 22, an external reaction torque is applied to the engine 22 by the powertrain (not shown) of the vehicle 10—in response to the torque applied by the engine 22 to the powertrain. As illustrated, the direction of the external reaction torque (counter-clockwise in FIG. 3A) is opposite the direction of the crankshaft rotation (clockwise in FIG. 3A).

The engagement of the clutch 24 to drive the compressor 12 results in an almost instantaneous reduction in the engine torque (not shown) and thus an almost instantaneous reduction in the external reaction torque. This instantaneous reduction in the external reaction torque is effectively a torque pulse in a direction counter to the direction of the external reaction torque (clockwise in FIG. 3A). As a result of the torque pulse, the vehicle occupants may feel an undesirable vibration during the engagement of the clutch 24.

Similarly, the disengagement of the clutch 24 results in an almost instantaneous increase in the engine torque (not shown) and thus an almost instantaneous increase in the external reaction torque. This instantaneous increase in the external reaction torque is effectively a torque pulse in the same direction as the external reaction torque (counter-clockwise in FIG. 3A). Similarly, as a result of the torque pulse, the vehicle occupants may feel an undesirable vibration during the disengagement of the clutch 24.

There is thus a need for a method of controlling a clutch for an engine-powered system in an automotive vehicle that minimizes or reduces one of more of the above-mentioned deficiencies.

SUMMARY OF THE INVENTION

The present invention provides a method of controlling a clutch for an engine-powered system (such as an air conditioner system) in an automotive vehicle to reduce and/or minimize a vehicle vibration due to a torque pulse generated by engaging and disengaging the clutch.

Referring to FIG. 3A, it has been determined that the best time in the natural oscillating roll movement of an engine to engage a clutch—and to absorb a corresponding torque pulse (in a clockwise direction in FIG. 3A)—is when the engine is moving at a maximum velocity and therefore momentum in a direction counter to the direction of the torque pulse (in a counter-clockwise direction in FIG. 3A). Thus the optimum time to engage the clutch is at the mid-travel position of the roll (i.e., position of maximum velocity) when the engine is moving in a counter-clockwise direction about the torque roll axis. Since there may be a small delay from the time the clutch is energized to the time the clutch actually engages a compressor, the optimum time to energize the clutch may be slightly before the mid-travel position.

Similarly, it has been determined that the best time in the natural oscillating roll movement of the engine to disengage the clutch—and to absorb a corresponding torque pulse (in a counter-clockwise direction in FIG. 3A)—is when the engine is moving about at a maximum velocity and therefore momentum in a direction counter to the direction of the torque pulse (in the clockwise direction in FIG. 3A). Thus the optimum time to disengage the clutch is at the mid-travel position of the roll (i.e., position of maximum velocity) when the engine is moving in a clockwise direction about the torque roll axis. Since there may be a small delay from the time the clutch is de-energized to the time the clutch actually disengages, the optimum time to de-energize the clutch may be slightly before the mid-travel position.

A method for controlling a clutch for an engine-powered system (such as an air conditioner system) in an automotive vehicle, includes the steps of generating an engine roll signal responsive to an oscillating roll movement of an engine about a torque roll axis. The method further includes the step of determining a direction of the oscillating roll movement utilizing the engine roll signal. Finally, the method includes the step of actuating the clutch responsive to an operational parameter of the engine-powered system and the direction of said oscillating roll movement. The operational parameter may be a pressure measurement in the air conditioner system.

An automotive vehicle in accordance with the present invention includes a clutch having a first state torsionally engaged with a component of an engine-powered system and a second state disengaged from the component of the engine-powered system. The vehicle further includes a first sensor generating a first signal indicative of an operational parameter of the engine-powered system. The vehicle further includes a second sensor generating a second signal responsive to the oscillating roll movement of the engine indicative of a direction of the oscillating roll movement. Finally, the vehicle includes a controller for actuating the clutch responsive to the operational parameter of the engine-powered system and to the direction of the oscillating roll movement. The engine-powered system may comprise an air conditioner system with a compressor driven by the engine.

A method and an automotive vehicle in accordance with the present invention represent a significant improvement over conventional methods and vehicles. In particular, the method and vehicle minimizes the vibration during the engagement and disengagement of a clutch from an air conditioner compressor. As a result, the vehicle occupants have a more comfortable ride in the vehicle when the air conditioner is turned on or off.

These and other features and advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
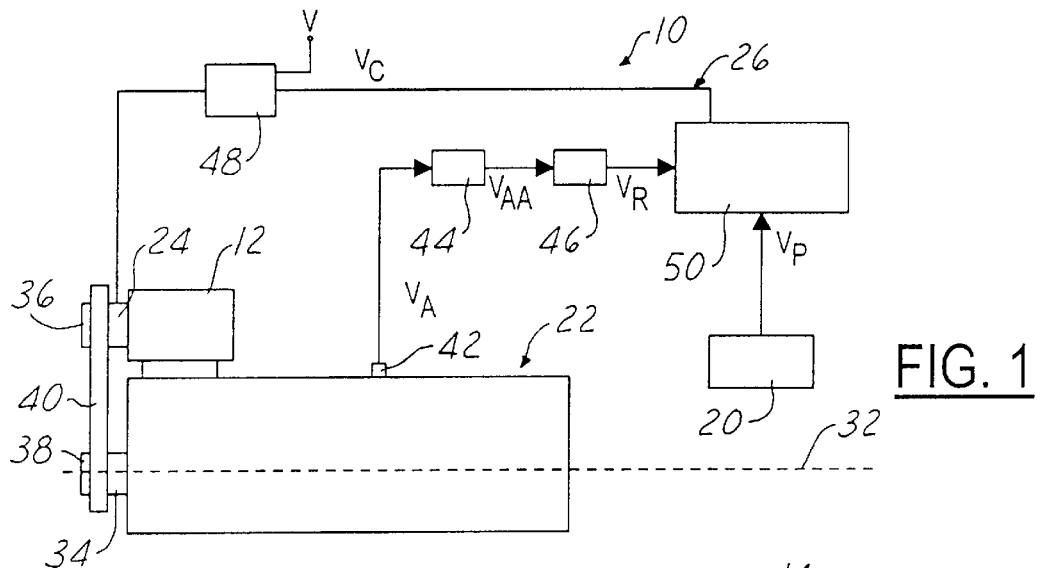
FIG. 1 is a combination schematic and block diagram of a conventional engine and an air conditioner system in an automotive vehicle in accordance with the present invention.

Referring now to the drawings wherein like reference numerals are used to identify identical components in the various views, FIG. 1 illustrates an automotive vehicle 10 having an engine 22 and an air conditioner system 26 in accordance with the present invention. It should be understood that the air conditioner system 26 comprises the conventional air conditioner system 10 including the pressure sensor 20, along with several additional components. The additional components of the air conditioner system 26 include an accelerometer sensor 42, an amplifier 44, a bandpass filter 46, a high current relay 48 and a controller 50.

Figures 3A, 3B:
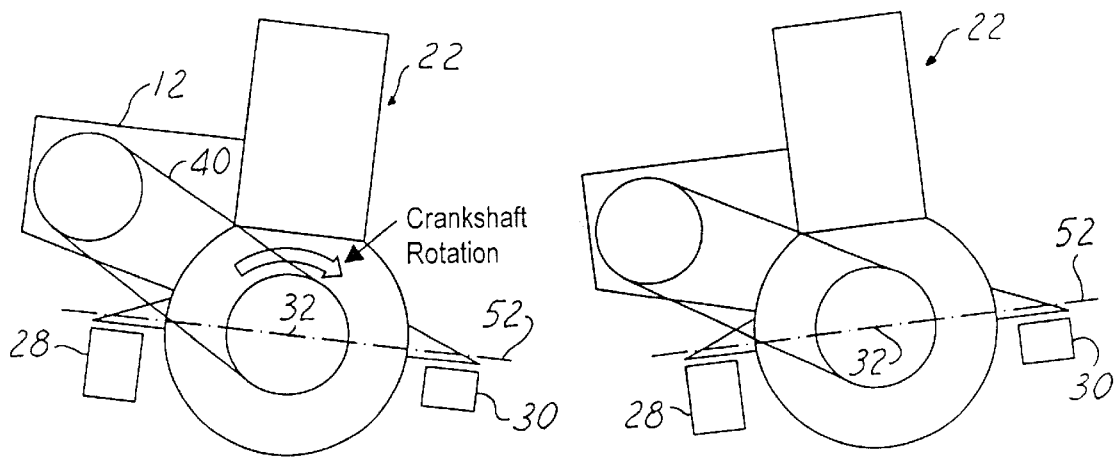
FIGS. 3A–B are front views of the conventional engine in FIG. 1 showing the two extremes of an oscillating roll movement of the engine about a torque roll axis.

The accelerometer sensor 42 is provided to generate an acceleration signal $V_A$ indicative of the oscillating roll movement of the engine 22 about the torque roll axis 32. The accelerometer sensor 42 is conventional in the art and may comprise a single axis accelerometer. Referring to FIG. 3B, the accelerometer sensor 42 may be disposed on the engine 22 either above or below a plane 52 passing through the torque roll axis 32 and the engine mounts 28, 30. The accelerometer sensor 42 may transmit the acceleration signal $V_A$ to the amplifier 44, or alternately, directly to the controller 50.

The amplifier 44 is provided to amplify the acceleration signal $V_A$ a predetermined amount to produce an amplified acceleration signal $V_{AA}$. The amplifier 44 is conventional in the art and comprises an operational amplifier or other type of solid-state amplifier. As illustrated, the amplifier 44 is a separate amplifier electrically connected between the accelerometer sensor 42 and the bandpass filter 46. In another embodiment, the amplifier 44 may be integrated into the controller 50. In still another embodiment, the amplifier 44 may be implemented using a conventional amplifier software algorithm stored in a read-only memory ROM (not shown) of the controller 50. In the foregoing embodiment, the acceleration signal $V_A$ could be transmitted directly to the controller 50. As illustrated, the amplifier 44 transmits the amplified acceleration signal $V_{AA}$ to the bandpass filter 46.

The bandpass filter 46 is provided to filter the amplified acceleration signal $V_{AA}$ to produce an engine roll signal $V_R$ within a predetermined frequency range. The filter 46 may be conventional in the art and may be constructed using solid-state components. As illustrated, the filter 46 is a separate filter electrically connected between the amplifier 44 and the controller 50. In another embodiment, the filter 46 may be integrated into the controller 52. In still another embodiment, the filter 46 may be implemented using a conventional filter software algorithm stored in the ROM of the controller 50. As discussed above, the oscillating roll movement and the amplified acceleration signal $V_{AA}$ have a relatively constant frequency at different engine speeds. Accordingly, the band-pass filter 46 may be configured to pass through frequencies close to the relatively constant frequency of the oscillating roll movement. It should be understood that one skilled in the art may readily determine the frequency of the oscillating roll movement for a specific engine. Further, the predetermined frequency range of the filter 46 may vary depending upon the frequency of the oscillating roll movement and the engine electrical noise. In one known engine, the oscillating roll movement of the engine had a frequency equal to about 9.5 Hertz (Hz). Further, the bandpass filter 46 has a predetermined frequency range of about 5–15 Hz Referring to FIGS. 5B and 5A, the engine roll signal $V_R$ (corresponding to the oscillating engine roll acceleration) and the related oscillating roll movement represented by a waveform 54 are illustrated. The engine roll signal $V_R$ is 180 degrees out of phase with the oscillating roll movement. The maximum speed of the oscillating roll movement of the engine 22 occurs when the waveform 54 is at a zero degree position value (e.g., point A on FIG. 5A) and concurrently when the engine roll signal $V_R$ is at a zero volt acceleration value (e.g., point A' on FIG. 5B). For purposes of illustration, the maximum oscillating roll movement of the engine 22 in a clockwise direction (as shown in FIG. 3A) occurs at a point B in the waveform 54 of FIG. 5A and at a point B' in FIG. 5B. Further, the maximum oscillating roll movement of the engine 22 in a counter-clockwise direction (as shown in FIG. 3B) occurs at a point C in the waveform 54 of FIG. 5A and a point C' in FIG 5B.

Figure 2:
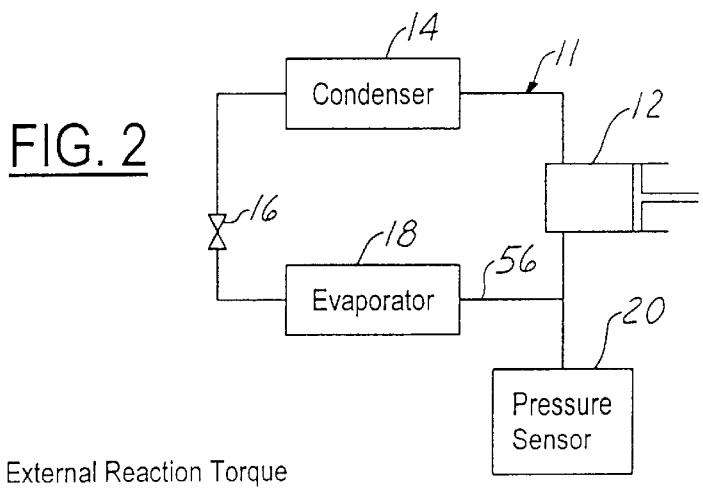
FIG. 2 is a combination schematic and block diagram of a conventional air conditioner system.

Referring to FIG. 1, the pressure sensor 20 may generate a signal $V_P$ (representing an operational parameter) indicating whether or not the clutch 24 should be engaged with the compressor 12. Referring to FIGS. 1 and 2, the pressure sensor 20 may be conventional in the art and may comprise a pressure switch. Accordingly, when the pressure in the conduit 56 is within a predetermined pressure range—indicating the clutch 24 should be engaged—the pressure switch 20 may close which generates the signal $V_P$ having a high logic voltage. Alternately, when the pressure in the conduit 56 is outside of the predetermined pressure range—indicating the clutch 24 should be disengaged—the pressure switch 20 may open which generates the signal $V_P$ having a low logic voltage. The pressure switch 20 may be remotely located, but in fluid communication with the conduit 56 that connects the evaporator 18 to the compressor 12. In an alternate embodiment, the pressure sensor 20 comprises a pressure sensor generating a pressure signal indicative of the pressure within the conduit 56.

Referring to FIG. 1, the high current relay 48 is provided to supply a current to the clutch 24 to engage the clutch 24 with the compressor 12. The relay 48 may actuate the clutch 24 responsive to a control signal $V_C$ from the controller 50. The relay 48 is conventional in the art and may comprise a solid-state relay or the like. As illustrated, the relay 48 is electrically connected to the controller 50, the ignition system (designated as V), and to the clutch 24.

The controller 50 is provided to actuate the clutch 24 responsive to a pressure measurement (i.e., operational parameter) represented by the pressure signal $V_P$ of the air conditioner system 26 and the direction of the oscillating roll movement. The controller 50 may be conventional in the art and may have a read-only memory ROM for storing software algorithms implementing portions of the inventive method described hereinbelow. As illustrated, the controller 50 is electrically connected to the filter 46, the pressure sensor 20, and the high current relay 48. The controller 50 generates a control signal $V_C$ having a high logic voltage responsive to the signal $V_P$ (having a high logic voltage) and the direction of the oscillating roll movement. In response to the control signal $V_C$ having a high logic voltage, the relay 48 closes and thereby supplies a current (e.g., about 3 amps) to the clutch 24 which engages the clutch. Alternately, the controller 50 generates a control signal $V_C$ having a low logic voltage responsive to the signal $V_P$ (having a low logic voltage) and the direction of the oscillating roll movement. In response to the control signal $V_C$ having a low logic voltage, the relay 48 opens to disengage the clutch 24.

Figure 4A:
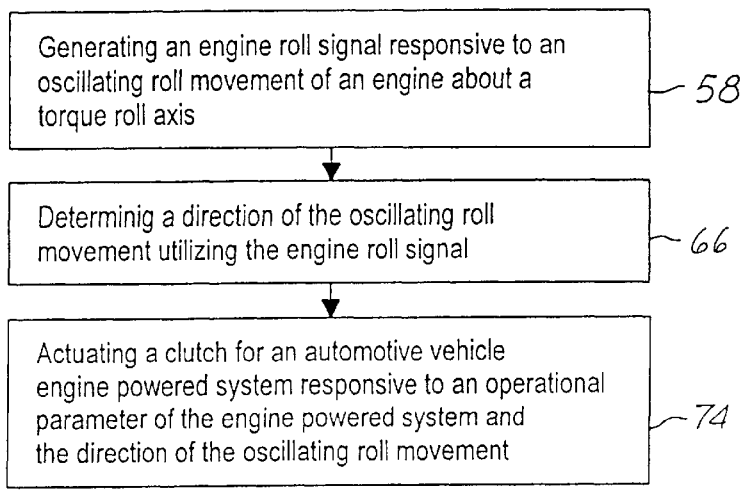
FIGS. 4A–C are flowcharts showing a method for controlling a clutch for an engine-powered system in accordance with the present invention.
Figure 4B:
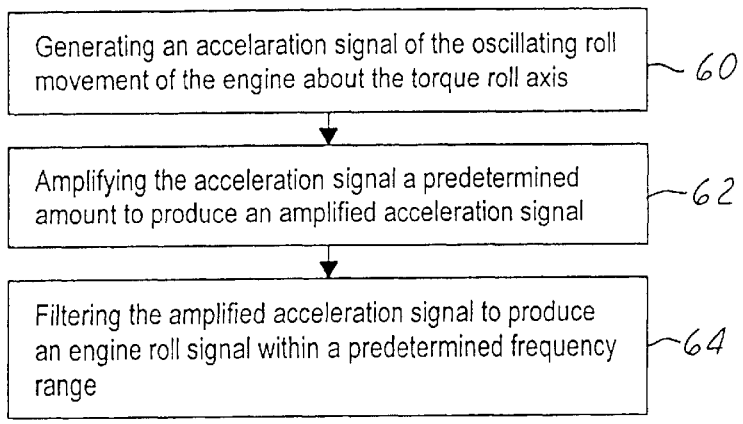

Referring to FIG. 4A, a method for controlling the clutch 24 in accordance with the present invention is illustrated. The inventive method includes a step 58 that generates the engine roll signal $V_R$ responsive to an oscillating roll movement of the engine 22 about the torque roll axis 32. Referring to FIG. 4B, the step 58 includes the substeps 60, 62, and 64. The substep 60 generates an acceleration signal $V_A$ of the oscillating roll movement of the engine 22 about the torque roll axis 32. As previously discussed, the accelerometer 42 generates the signal $V_A$. The substep 62 amplifies the acceleration signal $V_A$ a predetermined amount to produce the amplified acceleration signal $V_{AA}$. As previously discussed, the amplifier 44 generates the signal $V_{AA}$. The substep 64 filters the amplified acceleration signal $V_{AA}$ to produce an engine roll signal $V_R$ (shown in FIG. 5B) within a predetermined frequency range. As previously discussed, the filter 46 generates the engine roll signal $V_R$ corresponding to the oscillating engine roll acceleration.

Referring to FIG. 4A, the method further includes a step 66 that determines a direction of the oscillating roll movement of the engine 22 utilizing the engine roll signal $V_R$. A brief description of the theory for determining the direction of the oscillating roll movement will be described before discussing the substeps of the step 66.

Figure 5A:
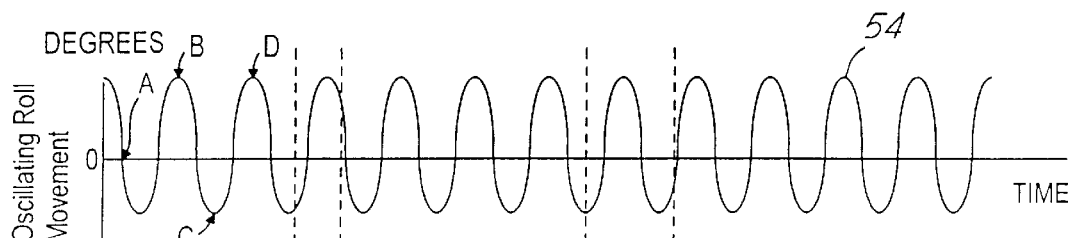
FIGS. 5A–E are diagrams illustrating engine and air conditioner signals in accordance with a method for controlling a clutch in accordance with the present invention.
Figure 5B:
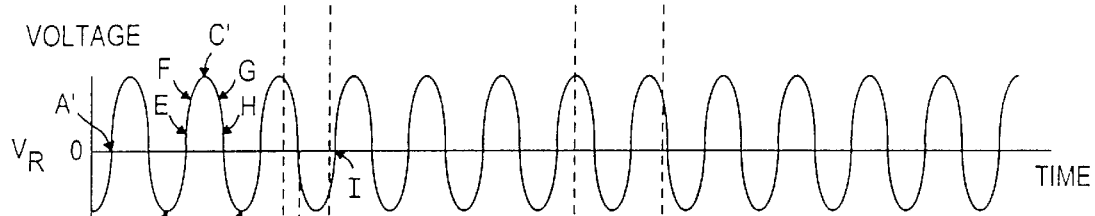

Referring to FIG. 5A, a portion of the waveform 54 from the point B (maximum clockwise engine roll position) to the point C (maximum counter-clockwise engine roll position) corresponds to the engine 22 moving in a counter-clockwise direction. Referring to FIG. 5B, therefore, the portion of the engine roll signal $V_R$ from the point B' to the point C' also corresponds to the engine 22 moving in a counter-clockwise direction. Accordingly, the difference between the first value E and the second value F of the engine roll signal $V_R$ results in a negative number—indicative of the engine 22 moving in a counter-clockwise direction.

Referring again to FIG. 5A, a portion of the waveform 54 from the point C (maximum counter-clockwise roll position) to the point D (maximum clockwise roll position) corresponds to the engine 22 moving in a clockwise direction. Referring to FIG. 5B, therefore, the portion of the engine roll signal $V_R$ from the point C' to the point D' also corresponds to the engine 22 moving in the clockwise direction. Accordingly, the difference between a first value G and a second value H of the engine roll signal $V_R$ results in a positive number—indicative of the engine 22 moving in a clockwise direction.

Figure 4C:
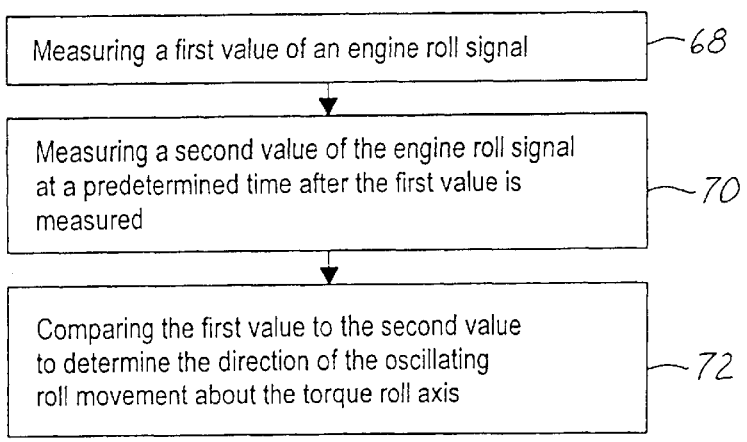

Referring to FIG. 4C, the step 66 includes the substeps 68, 70, and 72. The substep 68 measures a first value of the engine roll signal $V_P$. The substep 70 measures a second value of the engine roll signal $V_R$ a predetermined time after the first value is measured. The predetermined time is the inverse value of a sampling frequency of the engine roll signal $V_R$. Further, the sampling frequency of the engine roll signal $V_R$ must be at least twice the frequency of the engine roll signal $V_R$. The substep 72 compares the first value to the second value to determine the direction of the oscillating roll movement of the engine 22 about the torque roll axis 32.

Referring to FIG. 4A, the method further includes a step 74 that actuates the clutch 24 for the air conditioner system 26 (i.e., engine-powered system) responsive to a pressure signal $V_P$ (i.e., operational parameter) of the air conditioner system 26 and the direction of the oscillating roll movement. The actuation of the clutch 24 may correspond to (i) the first state torsional engagement of the clutch 24 with the compressor 12 or (ii) the second state disengagement of the clutch 24 from the compressor 12.

Figure 5C:
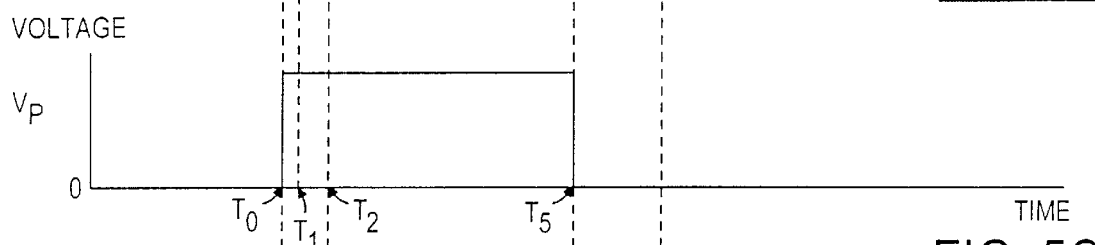
Figure 5D:
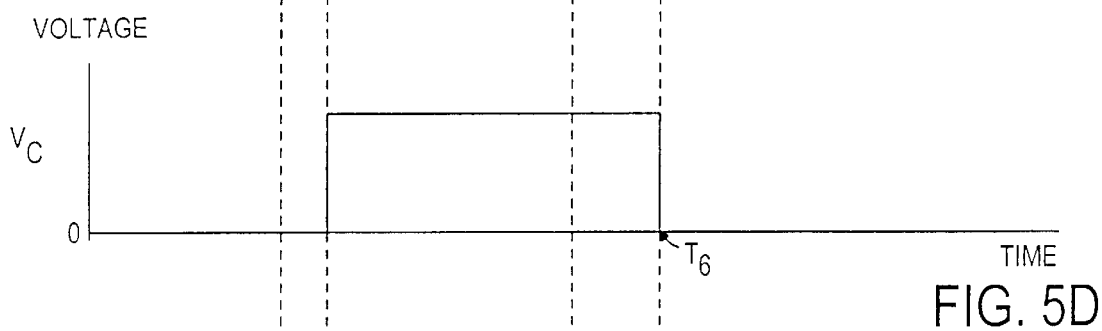
Figure 5E:
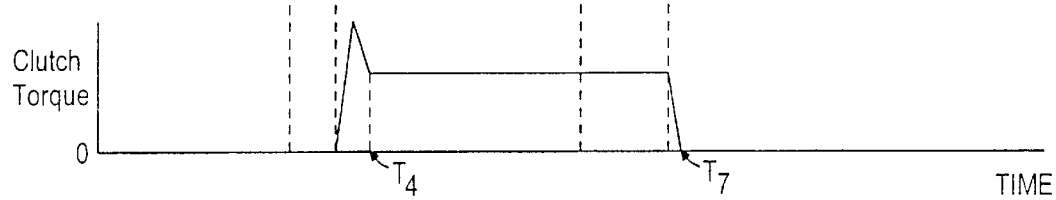

The substeps for the first state torsional engagement of the clutch 24 to the compressor 12 are described hereinafter. Referring to FIG. 3A, as previously discussed, engagement of the clutch 24 results in a torque pulse on the engine 22 in a clockwise direction. Therefore, the engagement of the clutch 24 should occur when the oscillating roll movement is in a counter-clockwise direction. Referring to FIG. 5C, at time $T_0$, the pressure signal $V_P$ changes from a low logic voltage to a high logic voltage—indicating that the clutch 24 should be torsionally engaged to the compressor 12. Referring to FIGS. 5B and 5D at time $T_2$, the engine roll signal $V_R$ (corresponding to the oscillating engine roll acceleration) indirectly indicates the direction of the oscillating roll movement is in a counter-clockwise direction. Accordingly, at time $T_2$, the controller 50 changes the control signal $V_C$ to a high logic voltage to initiate engagement of the clutch 24—just prior to the maximum oscillating roll movement velocity (when engine roll signal $V_R$ equals a zero value). In particular, the control signal $V_C$ is changed to the high logic voltage prior to the desired maximum oscillating roll movement velocity—to compensate for the delay time needed to mechanically engage the clutch 24. Accordingly, the clutch 24 torsionally engages the compressor 12 at about the maximum oscillating roll movement velocity. Referring to FIG. 5E, after time $T_2$, the clutch torque increases corresponding to the clutch 24 torsionally engaging the compressor 12. Further, the clutch torque has a transient torque spike—due to the accelerating compressor 12—before reaching a steady-state engagement torque at time $T_4$.

The substeps for the second state disengagement of the clutch 24 from the compressor 12 are described hereinafter. Referring to FIG. 3A, as previously discussed, disengagement of the clutch 24 results in a torque pulse on the engine 22 in a counter-clockwise direction. Therefore, the disengagement of the clutch 24 should occur when the oscillating roll movement is in clockwise direction. Referring to FIG. 5C, at time $T_5$, the pressure signal $V_P$ changes from a high logic voltage to a low logic voltage—indicating that the clutch 24 should be disengaged from the compressor 12. Referring to FIGS. 5B and 5D at time $T_2$, the engine roll signal $V_R$ (corresponding to the oscillating engine roll acceleration) indirectly indicates that the oscillating roll movement is moving in the clockwise direction. Accordingly, at time $T_6$, the controller 50 changes the control signal $V_C$ to a low logic voltage to initiate disengagement of the clutch 24 just prior to the maximum oscillating roll movement velocity (when engine roll signal $V_R$ equals a zero value). In particular, the control signal $V_C$ is changed to a low logic voltage prior to the desired maximum oscillating roll movement velocity, to compensate for the delay time needed to mechanically disengage the clutch 24 from the compressor 12. Accordingly, the clutch 24 disengages the compressor 12 at about the maximum oscillating roll movement velocity. Referring to FIG. 5E, after the time $T_6$, the clutch torque decreases corresponding to the clutch 24 disengaging the compressor 12. At time $T_7$, the clutch 24 is disengaged from the compressor 12.

The method and automotive vehicle in accordance with the present invention represent a significant improvement over conventional methods and vehicles. In particular, the inventive method and vehicle minimizes the vibration during the engagement and disengagement of a clutch from an engine-powered system. As a result, the vehicle occupants have a more comfortable ride in the automotive vehicle during the engagement and disengagement of the clutch.

Although the inventive method is utilized with an air conditioner system 10, it should be understood, however, that the method may be utilized with any engine-powered system utilizing a clutch. For example, the inventive method could be utilized with water pump systems, cooling fan systems, and engine speed accessory drives.

While the invention has been particularly shown and described with reference to a preferred embodiment thereof, it is well understood by those skilled in the art that various changes and modifications can be made in the invention without departing from the spirit and the scope of the invention.

We claim:

1. A method for controlling a clutch for an engine-powered system in an automotive vehicle, said clutch having a first state torsionally engaged with a component of said engine-powered system and a second state disengaged from said component of said engine-powered system, said vehicle having an engine with a torque roll axis extending therethrough, said engine having an oscillating roll movement about said torque roll axis during operation of said engine, said method comprising the steps of:

generating an engine roll signal responsive to said oscillating roll movement of said engine about said torque roll axis;

determining a direction of said oscillating roll movement utilizing said engine roll signal; and, actuating said clutch responsive to an operational parameter of said engine-powered system and said direction of said oscillating roll movement.

2. The method of claim 1 wherein said engine roll signal is indicative of an oscillating engine roll acceleration about said torque roll axis.

3. The method of claim 1 wherein said step of generating said engine roll signal includes the substeps of:

generating an acceleration signal of said oscillating roll movement of said engine about said torque roll axis;

amplifying said acceleration signal a predetermined amount to produce an amplified acceleration signal; and, filtering said amplified acceleration signal to produce an engine roll signal within a predetermined frequency range.

4. The method of claim 1 wherein said step of determining a direction of said oscillating roll movement includes the substeps of:

measuring a first value of said engine roll signal;

measuring a second value of said engine roll signal at a predetermined time after said first value is measured; and, comparing said first value to said second value to determine said direction of said oscillating roll movement about said torque roll axis.

5. The method of claim 1 wherein said engine-powered system comprises an air conditioner system and said component comprises a compressor torsionally engaged with said clutch in said first state.

6. The method of claim 5 wherein said air conditioner system includes an evaporator connected via a conduit to said compressor, wherein said operational parameter comprises a pressure measurement taken in said conduit.

7. The method of claim 1 wherein said engine has an external reaction torque applied to said engine in a first direction about said torque roll axis during operation of said engine, wherein said engagement of said clutch causes a torque on said engine in a second direction counter to said first direction and said clutch is only actuated to said first state from said second state when said oscillating roll movement is in said first direction.

8. The method of claim 7 wherein said engagement of said clutch occurs at about a maximum oscillating roll movement velocity.

9. The method of claim 8 wherein said engagement of said clutch is initiated prior to said maximum oscillating roll movement velocity.

10. The method of claim 1 wherein said engine has an external reaction torque applied to said engine in a first direction about said torque roll axis during operation of said engine, wherein said disengagement of said clutch causes a torque on said engine in said first direction and said clutch is only actuated to said second state from said first state when said oscillating roll movement is in a second direction counter to said first direction.

11. The method of claim 10 wherein said disengagement of said clutch occurs at about a maximum oscillating roll movement velocity.

12. The method of claim 11 wherein said disengagement of said clutch is initiated prior to said maximum oscillating roll movement velocity.

13. A method for controlling a clutch for an air conditioner system in an automotive vehicle, said clutch having a first state torsionally engaged with a compressor of said air conditioner system and a second state disengaged from said compressor, said vehicle having an engine powering said compressor via said clutch, said engine having a torque roll axis extending therethrough, said engine having an oscillating roll movement about said torque roll axis during operation of said engine, said method comprising the steps of:

generating an engine roll signal responsive to said oscillating roll movement of said engine about said torque roll axis;

measuring a first value of said engine roll signal;

measuring a second value of said engine roll signal at a predetermined time after said first value is measured;

comparing said first value to said second value to determine said direction of said oscillating roll movement about said torque roll axis;

measuring a pressure within said air conditioner system; and, actuating said clutch responsive to said measured pressure of said air conditioner system and said direction of said oscillating roll movement.

14. The method of claim 13 wherein said engine has an external reaction torque applied to said engine in a first direction about said torque roll axis during operation of said engine, wherein said engagement of said clutch causes a torque on said engine in a second direction counter to said first direction and said clutch is only actuated to said first state from said second state when said oscillating roll movement is in said first direction and is at about a maximum velocity.

15. The method of claim 13 wherein said engine has an external reaction torque applied to said engine in a first direction about said torque roll axis during operation of said engine, wherein said disengagement of said clutch causes a torque on said engine in said first direction and said clutch is only actuated to said second state from said first state when said oscillating roll movement is in a second direction counter to said first direction and is at about a maximum velocity.

16. An automotive vehicle having an engine and an engine-powered system, said engine having a torque roll axis extending therethrough, said engine having an oscillating roll movement about said torque roll axis during operation of said engine, said vehicle comprising:

a clutch having a first state torsionally engaged with a component of said engine-powered system and a second state disengaged from said component of said engine-powered system;

a first sensor generating a first signal indicative of an operational parameter of said engine-powered system;

a second sensor generating a second signal responsive to said oscillating roll movement of said engine indicative of a direction of said oscillating roll movement; and, a controller for actuating said clutch responsive to said operational parameter of said engine-powered system and to said direction of said oscillating roll movement.

17. The automotive vehicle of claim 16 wherein said engine-powered system comprises an air conditioner system and said component comprises a compressor.

18. The automotive vehicle of claim 17 wherein said first sensor is a pressure sensor and said first signal is indicative of a pressure within said air conditioner system.

19. The automotive vehicle of claim 16 wherein said second sensor is an accelerometer sensor and said second signal is an acceleration signal.

20. The automotive vehicle of claim 16 wherein said engine has an external reaction torque applied to said engine in a first direction about said torque roll axis during operation of said engine, wherein said engagement of said clutch causes a torque on said engine in a second direction counter to said first direction, wherein said controller only actuates said clutch to said first state from said second state when said oscillating roll movement is in said first direction.

21. The automotive vehicle of claim 16 wherein said engine has an external reaction torque applied to said engine in a first direction about said torque roll axis during operation of said engine, wherein said disengagement of said clutch causes a torque on said engine in said first direction, wherein said controller only actuates said clutch to said second state from said first state when said oscillating roll movement is in a second direction counter to said first direction.

\* \* \* \* \*